United States Patent
Sakimura et al.

(10) Patent No.: US 8,085,007 B2
(45) Date of Patent: Dec. 27, 2011

(54) SWITCHING POWER SUPPLY CIRCUIT

(75) Inventors: Hiroko Sakimura, Osaka (JP);
Kazuhiro Murata, Osaka (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 12/539,245

(22) Filed: Aug. 11, 2009

(65) Prior Publication Data
US 2010/0039087 A1 Feb. 18, 2010

(30) Foreign Application Priority Data

Aug. 18, 2008 (JP) ................... 2008-209652
Jun. 3, 2009 (JP) ................... 2009-133809

(51) Int. Cl.
*G05F 1/613* (2006.01)
*G05F 1/10* (2006.01)
*G05F 1/40* (2006.01)
(52) U.S. Cl. ............... 323/224; 323/222; 323/271
(58) Field of Classification Search .......... 323/222–225, 323/268, 271, 282, 285
See application file for complete search history.

(56) References Cited

U.S. PATENT DOCUMENTS

| | | | | |
|---|---|---|---|---|
| 5,444,358 | A | * | 8/1995 | Delepaut ................ 323/222 |
| 5,886,885 | A | * | 3/1999 | Fujie ..................... 363/49 |
| 6,294,903 | B1 | | 9/2001 | Yamashita et al. |
| 7,863,870 | B2 | * | 1/2011 | Nathan ................... 323/222 |
| 2003/0095422 | A1 | | 5/2003 | Nagaki et al. |
| 2008/0265670 | A1 | | 10/2008 | Pansier |
| 2009/0116265 | A1 | | 5/2009 | Saji |
| 2009/0146624 | A1 | * | 6/2009 | Kim et al. ................ 323/271 |

FOREIGN PATENT DOCUMENTS

| | | |
|---|---|---|
| JP | 10-191625 | 7/1998 |
| JP | 2000-152610 | 5/2000 |
| JP | 2006-340563 | 12/2006 |
| JP | 2007-159304 | 6/2007 |
| JP | 2008-507950 | 3/2008 |

OTHER PUBLICATIONS

English language Abstract and translation of Fig. 3 of JP 10-191625, Jul. 21, 1998.
English language Abstract of JP 2006-340563, Dec. 14, 2006.
English language Abstract and translation of Fig. 1 of JP 2007-159304, Jun. 6, 2007.

* cited by examiner

*Primary Examiner* — Matthew Nguyen
(74) *Attorney, Agent, or Firm* — Greenblum & Bernstein, P.L.C.

(57) ABSTRACT

A switching power supply circuit, which includes: a switch; a coil serving as an energy transmitting element; and a capacitor serving as an output generation circuit that outputs, as an output voltage, the energy transmitted from the coil. The switching power supply circuit also includes an output voltage detection circuit that generates a detection signal according to the output voltage; a PNP transistor serving as a transmission circuit that outputs a transmission signal according to a value of the detection signal; and a controller that controls the switch according to the transmission signal. The switching power supply circuit further includes a diode serving as a rectifying element connected between the transmission circuit (PNP transistor) and the controller.

13 Claims, 8 Drawing Sheets

FIG. 8

SWITCHING POWER SUPPLY CIRCUIT

BACKGROUND OF THE INVENTION (1) Field of the Invention

The present invention relates to a switching power supply circuit which, as a non-insulated power supply circuit that stabilizes DC output voltage, stabilizes output voltage using a three-terminal switching regulator.

(2) Description of the Related Art

Conventionally, switching power supply circuits have been widely used which, by using a three-terminal switching regulator, stabilize output voltage as non-insulated power supply circuits that stabilize DC output voltage in power supply circuits incorporated in electronic devices, for example.

A conventional switching power supply circuit provides feedback of output voltage using a transmission circuit having insulated input and output like a photocoupler as a transmission circuit transmitting a signal corresponding to output voltage to a controller that controls switching operations (see, for example, FIG. 6 of Patent Reference 1: U.S. Pat. No. 6,294,903 (FIGS. 5 and 6)).

SUMMARY OF THE INVENTION

Such a conventional switching power supply circuit, however, has a circuit configuration that needs an element having insulated input and output like a photocoupler, although it is a power supply circuit having non-insulated input and output. Thus, the insulated element such as a photocoupler raises the cost, making cost reduction difficult.

The present invention is to solve the above conventional problem, and an object of the present invention is to provide, as a non-insulated power supply circuit including a three-terminal switching regulator, a switching power supply circuit at low cost by using a non-insulated element as a transmission unit.

In order to solve the above problem, a switching power supply circuit according to an aspect of the present invention is a switching power supply circuit including: a switch connected to one of two input terminals to which an input voltage is applied; an energy transmitting element which transmits, as energy, the input voltage applied through the switch; an output generation circuit which smoothes the energy transmitted by the energy transmitting element and outputs the smoothed energy through two output terminals as an output voltage; an output voltage detection circuit which detects the output voltage of the output generation circuit and generates a detection signal according to the output voltage; a transmission circuit which is connected to one of the two output terminals and outputs a transmission signal according to a value of the detection signal generated by the output voltage detection circuit; a control circuit which generates a drive signal that controls the switching of the switch according to the transmission signal, using a potential at a node between the switch and the energy transmitting element as an operating reference voltage; and a rectifying element which is connected between the transmission circuit and the control circuit and outputs the transmission signal only in a direction from the transmission circuit to the control circuit.

According to this configuration, the non-insulated power supply circuit including a three-terminal switching regulator uses a non-insulated rectifying element instead of a photocoupler. This makes cost reduction possible.

Here, the rectifying element may have a withstanding voltage equal to or greater than a sum of the input voltage and a forward drop voltage across the rectifying element.

Here, the switching power supply circuit may further include a conversion circuit inserted between the rectifying element and the control circuit, and the conversion circuit may convert the transmission signal into a constant voltage.

Here, the conversion circuit may include a capacitor inserted between: a node between the rectifying element and the control circuit; and a node between the switch and the energy transmitting element.

Here, the transmission circuit may be a bipolar transistor.

Here, the transmission circuit may be a metal oxide semiconductor (MOS) transistor.

Here, the output voltage detection circuit may include: a first resistor and a second resistor inserted in series between the two output terminals; and a current signal output circuit which outputs, to the transmission circuit, a current signal according to a divided voltage at a node between the first resistor and the second resistor, as the detection signal.

Here, the current signal output circuit may include a shunt regulator having: a cathode connected to the transmission circuit; an anode connected to the other one of the two output terminals; and a reference terminal which uses the divided voltage as a reference voltage.

Here, the output voltage detection circuit may include: a third resistor and a Zener diode inserted in series between the two output terminals; and a transistor having a base connected to the node between the first resistor and the second resistor, a collector connected to the transmission circuit, and an emitter connected to a node between the third resistor and the Zener diode.

Here, the output voltage detection circuit may include a third resistor and a Zener diode inserted in series between the two output terminals, the Zener diode may have a cathode connected to the third resistor and an anode connected to the other one of the two output terminals, and the output voltage detection circuit may output, to the transmission circuit, the detection signal according to a current signal applied to the cathode of the Zener diode.

Here, the control circuit may generate the drive signal for controlling, according to a value of the transmission signal, an ON time period of the switch such that the output voltage detected by the output voltage detection circuit is constant.

Here, the control circuit may generate the drive signal for controlling, according to a value of the transmission signal, a peak value of a current flowing from the switch into the energy transmitting element during an ON time period of the switch such that the output voltage detected by the output voltage detection circuit is constant.

Here, the control circuit may generate the drive signal for controlling, according to a value of the transmission signal, a switching frequency of the switch such that the output voltage detected by the output voltage detection circuit is constant.

Here, the control circuit may generate the drive signal for controlling, according to a value of the transmission signal, a switching operating period and a switching suspending period of the switch such that the output voltage detected by the output voltage detection circuit is constant.

Here, the switch may be connected to one of the two input terminals which is on a positive voltage side of the input voltage, the other input terminal on a negative voltage side of the input voltage may be connected to one of the two output terminals which is on the negative voltage side, and the switching power supply circuit may be of a positive voltage output type.

Here, the switch may be connected to one of the two input terminals which is on a positive voltage side of the input voltage, the other input terminal on a negative voltage side of the input voltage may be connected to one of the two output terminals which is on the positive voltage side, and the switching power supply circuit may be of a negative voltage output type.

As described above, according to the present invention, a non-insulated power supply circuit including a three-terminal switching regulator can control the stabilization of the output voltage by using a transmission unit with non-insulated input and output for providing feedback of voltage fluctuations at the output unit.

Therefore, a non-insulated power supply circuit including a three-terminal switching regulator can be provided at low cost by replacing an expensive element having insulated input and output with an inexpensive, non-insulated element as the transmission unit.

Further Information About Technical Background to this Application

The disclosures of Japanese Patent Application No. 2008-209652 filed on Aug. 18, 2008 and Japanese Patent Application No. 2009-133809 filed on Jun. 3, 2009 including specification, drawings and claims are incorporated herein by reference in their entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

With reference to the drawings, a switching power supply circuit showing embodiments of the present invention will be hereinafter described in detail. It is to be noted that throughout the embodiments, the constituent elements with the same reference numerals perform the same operations, and thus the descriptions thereof may not be repeated. Further, the accompanying drawings show details of an example of the present invention, and thus the present invention is not limited to the accompanying drawings.

Embodiment 1

A switching power supply circuit in Embodiment 1 of the present invention will be hereinafter described.

Figure 1:
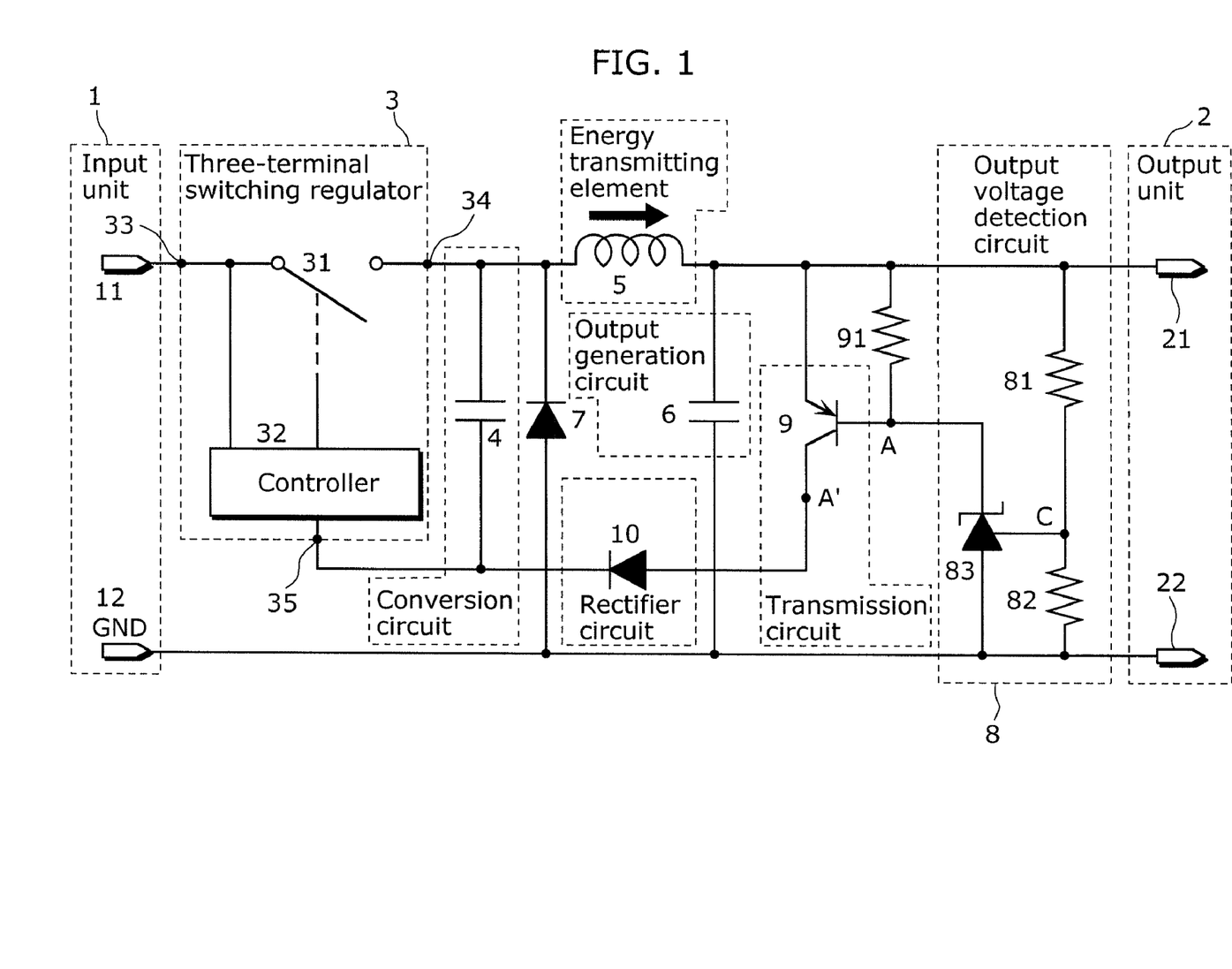
FIG. 1 is a schematic circuit diagram showing a configuration of a switching power supply circuit in Embodiment 1 of the present invention.

FIG. 1 is a schematic circuit diagram showing a configuration of a switching power supply circuit in Embodiment 1. As shown in FIG. 1, the switching power supply circuit in Embodiment 1 includes an input unit 1, an output unit 2, a three-terminal switching regulator 3, a capacitor 4 which is a conversion circuit, a coil 5 which is an energy transmitting element, a capacitor 6 which is an output generation circuit, a diode 7, an output voltage detection circuit 8, a PNP transistor 9 which is a transmission circuit, and a diode 10 which is a rectifying element.

The input unit 1 has a positive voltage terminal 11 and a negative voltage terminal 12, and receives an input voltage VIN.

The output unit 2 has a positive voltage terminal 21 and a negative voltage terminal 22, and outputs a voltage through these terminals.

The three-terminal switching regulator 3 is applied with the input voltage VIN from the positive voltage terminal 11 of the input unit 1, and outputs to the coil 5 a voltage obtained through the input voltage VIN applied through the switch.

The capacitor 4 supplies a power supply voltage of the three-terminal switching regulator 3. The capacitor 4 serves also as a conversion circuit which converts a transmission signal provided from the diode 10 into a constant current and a constant voltage.

The coil 5 is an energy transmitting element inserted between the three-terminal switching regulator 3 and the output unit 2.

The capacitor 6 is an output generation circuit which smoothes a voltage to be provided from the coil 5 to the output unit 2.

The diode 7 has a cathode connected to a node between the three-terminal switching regulator 3 and the coil 5, and an anode connected to the negative voltage terminal 22 of the output unit 2.

The output voltage detection circuit 8 detects an output voltage VO of the output unit 2.

The PNP transistor 9 is a transmission circuit which provides the three-terminal switching regulator 3 with feedback of a signal corresponding to the output voltage detected by the output voltage detection circuit 8.

The diode 10 is a rectifying element inserted between the collector of the PNP transistor 9 and the three-terminal switching regulator 3.

The output voltage detection circuit 8 includes: a first resistor 81 and a second resistor 82 connected in series to be inserted between the positive voltage terminal 21 and the negative voltage terminal 22 of the output unit 2; and a shunt regulator 83 having a cathode connected to the base of the PNP transistor 9, an anode connected to the negative voltage terminal 22 of the output unit 2, and a reference voltage detection terminal connected to a node between the first resistor 81 and the second resistor 82.

The operations of the switching power supply circuit having the above configuration will be hereinafter described.

Figure 2:
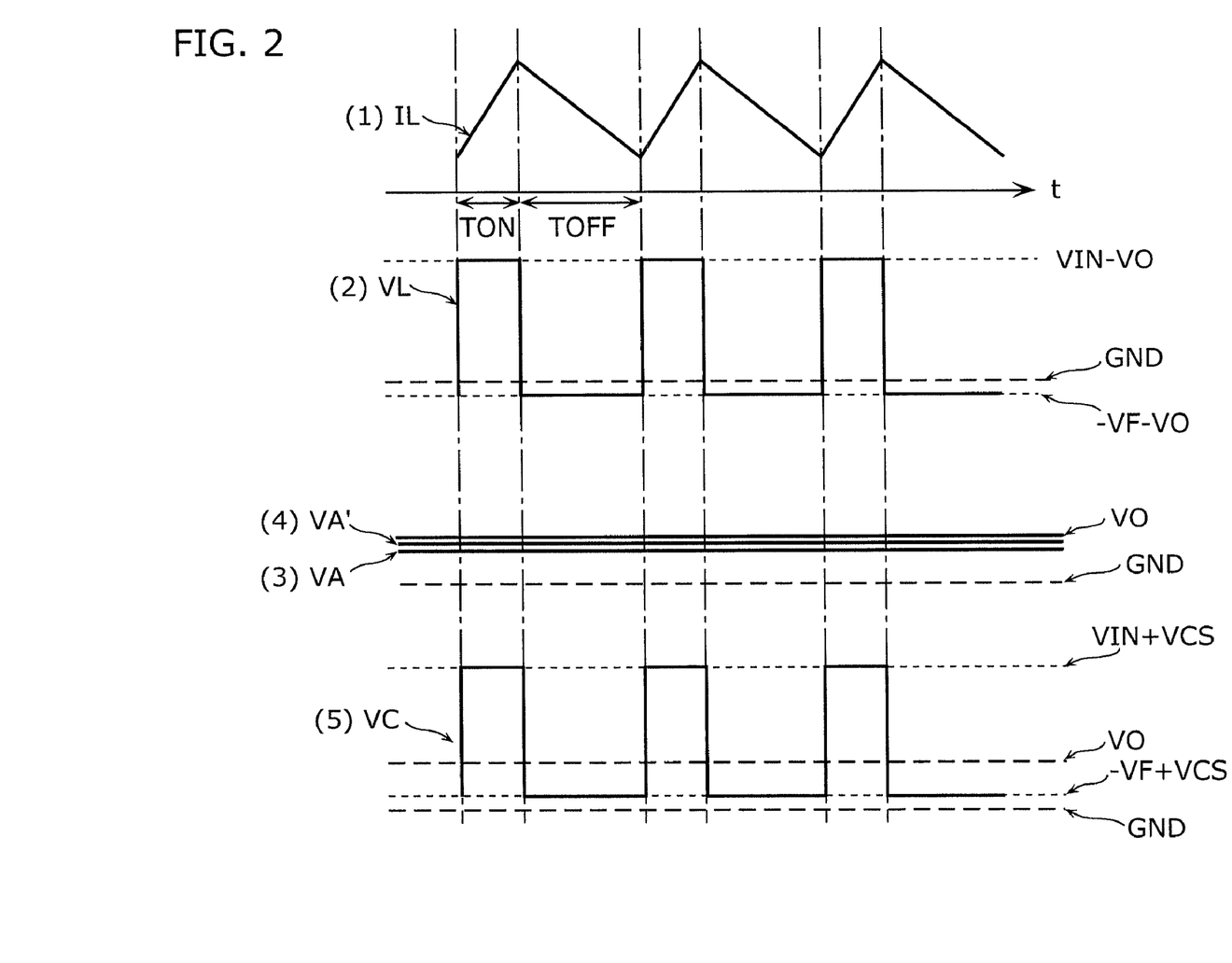
FIG. 2 is a waveform chart showing operations of a switching power supply circuit in Embodiment 1.
Figure 7:
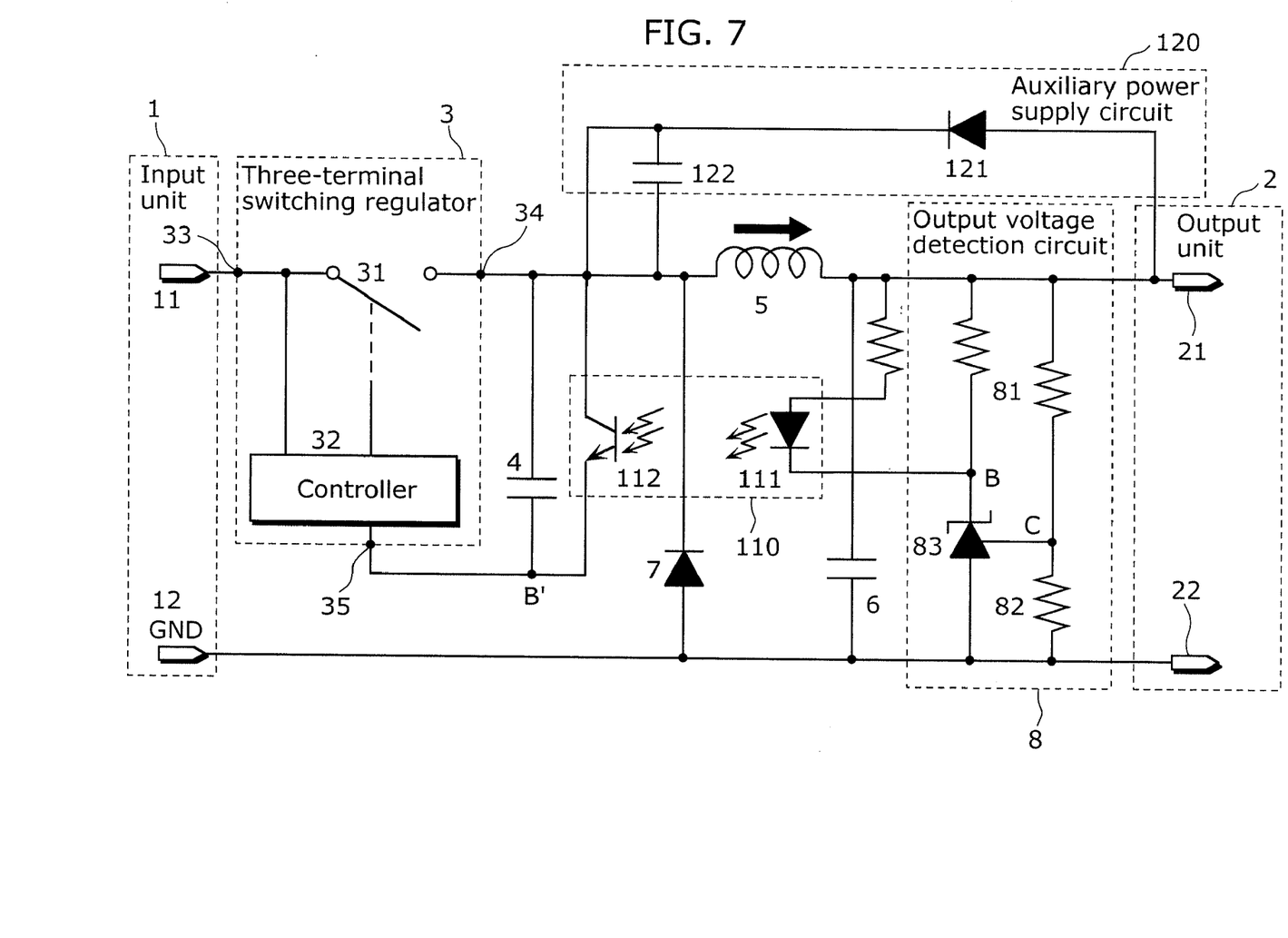
FIG. 7 is a schematic circuit diagram showing a configuration of a switching power supply circuit as a comparative example.
Figure 8:
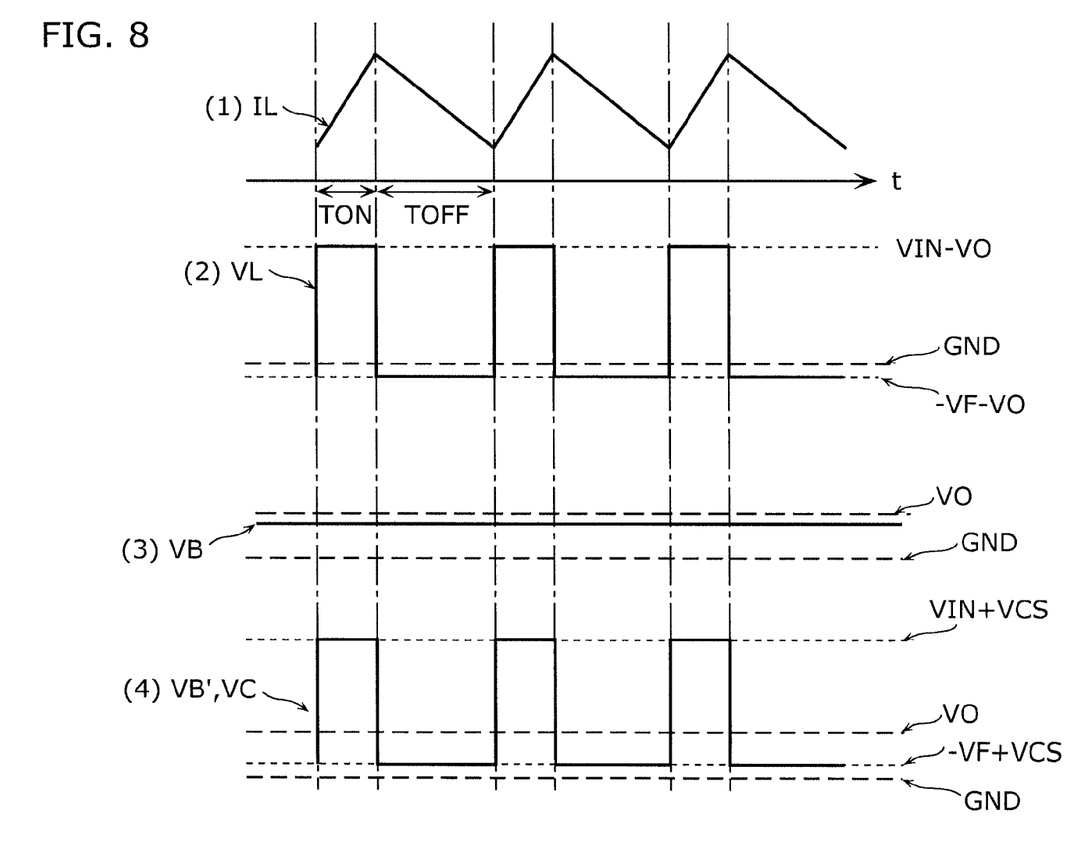
FIG. 8 is a waveform chart showing operations of a switching power supply circuit as a comparative example.

FIG. 2 is a waveform chart showing operations of the switching power supply circuit in Embodiment 1. The operations described here are only the operations of the transmission circuit (the PNP transistor 9), the rectifier circuit (the diode 10), and the capacitor 4 that are components different from those in a later-described comparative example (FIGS. 7 and 8). Descriptions of the operations of the same components as those in the comparative example will be omitted. Further, the operations of the three-terminal switching regulator 3 and the coil 5 are the same as those in the comparative example. Thus, the operating waveforms of a current IL flowing through the coil shown as a waveform (1) and a potential difference VL created across the coil shown as a waveform (2) in FIG. 2 are the same as the operating waveforms of a current IL flowing through the coil shown as a waveform (1) and a potential difference VL created across the coil shown as a waveform (2) in the comparative example in FIG. 8.

In FIG. 2, the waveform (1) IL shows an image of a current flowing through the coil 5, the waveform (2) VL shows an image of a potential difference created across the coil 5, a waveform (3) VA shows an image of a voltage at the base of the PNP transistor 9 (at the point A in FIG. 1), a waveform (4) VA' shows an image of a voltage at the collector of the PNP transistor 9 (at the point A' in FIG. 1), and a waveform (5) shows an image of a control terminal voltage VC.

In FIG. 2, TON is the ON period of a switch 31, TOFF is the OFF period of the switch 31, VS is a voltage at a source terminal 34, VC is a voltage at a control terminal 35, VCS is a voltage at the control terminal 35 with respect to a potential at the source terminal 34, and the waveforms (3) VA, (4) VA', and (5) VC are operating waveforms using a reference voltage GND of the power supply as a reference. Further, with the operating waveforms in FIG. 2, the forward direction is assumed to be the direction of the arrow of the current IL flowing through the coil 5 in FIG. 1.

The first resistor 81 and the second resistor 82 of the output voltage detection circuit 8 have resistance values which are set such that when the output voltage VO of the output unit 2 matches the output voltage set according to power supply specifications, the voltage at a node C between the first resistor 81 and the second resistor 82 matches a reference voltage that is pre-set in the shunt regulator 83.

Here, when the output voltage VO increases or decreases, the voltage at the node C between the first resistor 81 and the second resistor 82 increases or decreases accordingly, and the voltage at the node C is applied to the reference voltage detection terminal of the shunt regulator 83. The amount of current flowing from the cathode to anode of the shunt regulator 83 fluctuates according to an error between the voltage at the node C and the reference voltage of the shunt regulator 83.

When the current flows into the shunt regulator 83, it flows into a third resistor 91 inserted between the cathode of the shunt regulator 83 and the positive voltage terminal 21 of the output unit 2, and a voltage drop across the third resistor 91 generates a voltage across the emitter and base of the PNP transistor 9, causing the current to flow also between the emitter and base of the PNP transistor 9. Here, fluctuations of the current flowing between the emitter and base of the PNP transistor 9 match the fluctuations of the current flowing from the cathode to anode of the shunt regulator 83. When the current flows between the emitter and base of the PNP transistor 9, a current corresponding to the emitter-base current flows between the emitter and collector. With the above series of operations, a current corresponding to a current signal of an error in the output voltage VO flows between the emitter and collector of the PNP transistor 9 and into the anode of the diode 10.

Here, the voltage at the base of the PNP transistor 9 (the point A in FIG. 1) is lower than the voltage at the positive voltage terminal 21 of the output unit 2 by the voltage across the emitter and base of the PNP transistor 9, and the potential at the positive voltage terminal 21 of the output unit 2 is constant with the output voltage VO with respect to GND. Therefore, as shown in the waveform (3) in FIG. 2, the operating waveform of the voltage at the base of the PNP transistor 9 is constant with respect to GND.

Similarly, during a steady operation, feedback of the output voltage is consistently provided, the current consistently flows between the emitter and base of the PNP transistor 9, and there is continuity between the emitter and collector of the PNP transistor 9. Therefore, with the reference voltage GND of the power supply as the reference, the collector voltage VA' at the PNP transistor 9 has a constant operating waveform with a voltage lower than the voltage VO at the positive voltage terminal 21 of the output unit 2 by the voltage across the emitter and collector of the PNP transistor 9 as shown in the waveform (4) in FIG. 2.

The current flowed into the anode of the diode 10 flows out from the cathode and into the control terminal 35 of the three-terminal switching regulator 3 only when the voltage at the anode of the diode 10 (or the voltage at the collector of the PNP transistor 9, the point A' in FIG. 1) is higher than the voltage at the cathode of the diode 10 (or the control terminal voltage VC).

During the OFF period TOFF of the switch 31, the current flows into the diode 10 because as shown in the waveforms (4) and (5) in FIG. 2, the voltage VA' at the collector of the PNP transistor 9 is higher than the control terminal voltage VC. Here, the voltage VA' at the collector of the PNP transistor 9 needs to be a value higher than the control terminal voltage VC by a forward drop voltage VF across the diode 10.

During the ON period TON of the switch 31, the current does not flow through the diode 10 because as shown in the waveforms (4) and (5) in FIG. 2, the voltage VO at the positive voltage terminal 21 of the output unit 2 becomes lower than the control terminal voltage VC and thus the voltage becomes higher at the cathode of the diode 10 than at the anode.

As a result, only during the OFF period TOFF of the switch 31, the diode 10 applies a current transmission signal in the direction from the PNP transistor 9 to a controller 32, and the capacitor 4 which serves also as a conversion circuit converts the pulsed current transmission signal corresponding to the current signal provided from the output voltage detection circuit 8 into a constant current/voltage feedback signal which is then applied to the control terminal 35. It becomes possible to steadily provide the controller 32 with feedback of a current/voltage feedback signal according to the fluctuations of the output voltage VO and, at the same time, to supply the power supply voltage of the controller 32. As a result, the above power supply control can be achieved.

Since the controller 32 controls switching of the switch 31 according the amount of the current flowing into the control terminal 35, the ON duty of the switch 31 varies so that the error in the output voltage VO reduces. This way, the output voltage VO is maintained constant.

Here, the difference between the voltage at the collector of the PNP transistor 9 (the waveform (4) in FIG. 2) and the voltage at the control terminal 35 (the waveform (5) in FIG. 2) fluctuates according to the switching of the switch 31. This voltage difference does not go beyond the fluctuation band of the control terminal voltage VC, and thus the diode 10 inserted between the collector of the PNP transistor 9 and the control terminal 35 needs to have a withstanding voltage equal to or greater than the fluctuation band of the control terminal voltage VC. Here, the fluctuation band of the control terminal voltage VC is (VIN+VCS)−(−VF+VCS)=(VIN+VF) as seen from the waveform (5) in FIG. 2, and thus the diode 10 needs to have a withstanding voltage equal to or greater than (VIN+VF).

Further, as shown in the waveforms (3) and (4) in FIG. 2, the 1o voltage at the base that is the input terminal of the PNP transistor 9 serving as the transmission unit (the waveform (3) in FIG. 2) and the voltage at the collector that is the output terminal (the waveform (4) in FIG. 2) are consistently constant with respect to GND. The voltage difference therebetween is determined based on the characteristics of the voltage across the emitter and collector of the PNP transistor 9, and thus, the withstanding voltage of the PNP transistor is not exceeded. For this reason, the input and output of the transmission unit need not to be insulated.

As above, according to Embodiment 1, insertion, between the transmission unit and the controller 32, of the diode 10 serving as a rectifying element with a sufficient withstanding voltage allows configuration of the transmission circuit using a transistor which is not insulated and does not have a high withstanding voltage. Transmission circuits have conventionally needed an element having insulated input and output such as a photocoupler. In the present embodiment, however, it is unnecessary to provide such an element having insulated input and output such as a photocoupler, and a transmission circuit can be configured using a PNP transistor and the like having non-insulated input and output. As a result, cost reduction is possible.

It is to be noted that according to Embodiment 1, use of a diode having a high withstanding voltage as the diode 10 allows application to a power supply circuit with high input voltage VIN.

It is to be noted that according to Embodiment 1, the controller 32 of the three-terminal switching regulator 3 controls the drive signal of the switch 31 according to the current signal applied to the control terminal 35; however, the present invention is not limited to this. The above power supply control can be achieved even with a method in which the controller 32 of the three-terminal switching regulator 3 controls the drive signal of the switch 31 according to fluctuations of the voltage at the control terminal 35 with respect to the source terminal 34.

It is to be noted that according to Embodiment 1, since the current flowing in the direction from the diode 10 to the control terminal 35 flows in a pulsed manner according to the switching of the switch 31, the capacitor 4 inserted between the diode 10 and the control terminal 35 is used as the conversion circuit that converts a current signal into a constant current/voltage signal; however, the present invention is not limited to this. As long as it is a circuit that converts a pulsed current signal into a constant current/voltage signal, any method may be adopted for the conversion, such as averaging or peak-holding current/voltage.

Furthermore, according to Embodiment 1, the method used in the controller 32 for controlling the switch 31 is described as the PWM control method by which duty is varied; however, the present invention is not limited to this Other control methods may also be adopted such as: a current-mode PWM control method for varying the peak of the current flowing between a drain terminal 33 and the source terminal 34; a PFM control method for varying the oscillation frequency; and an intermittent control method for repeating an oscillation period and a non-oscillation period.

In addition, according to Embodiment 1, the output voltage detection circuit 8 is configured with the resistors 81 and 82 and the shunt regulator 83; however, the present invention is not limited to this. Any configuration may be adopted as long as it is a circuit which can detect an error in the output voltage VO of the output unit 2, convert the error into a current signal, and feed a current corresponding to the current signal between the emitter and base of the PNP transistor 9.

Moreover, according to Embodiment 1, the PNP transistor 9 is configured with a PNP bipolar transistor; however, the present invention is not limited to this. Any configuration may be adopted as long as it is a circuit which can apply, to the diode 10 that is a rectifying element, a signal corresponding to the current signal provided from the output voltage detection circuit 8.

Embodiment 2

A switching power supply circuit in Embodiment 2 of the present invention will be hereinafter described.

Figure 3:
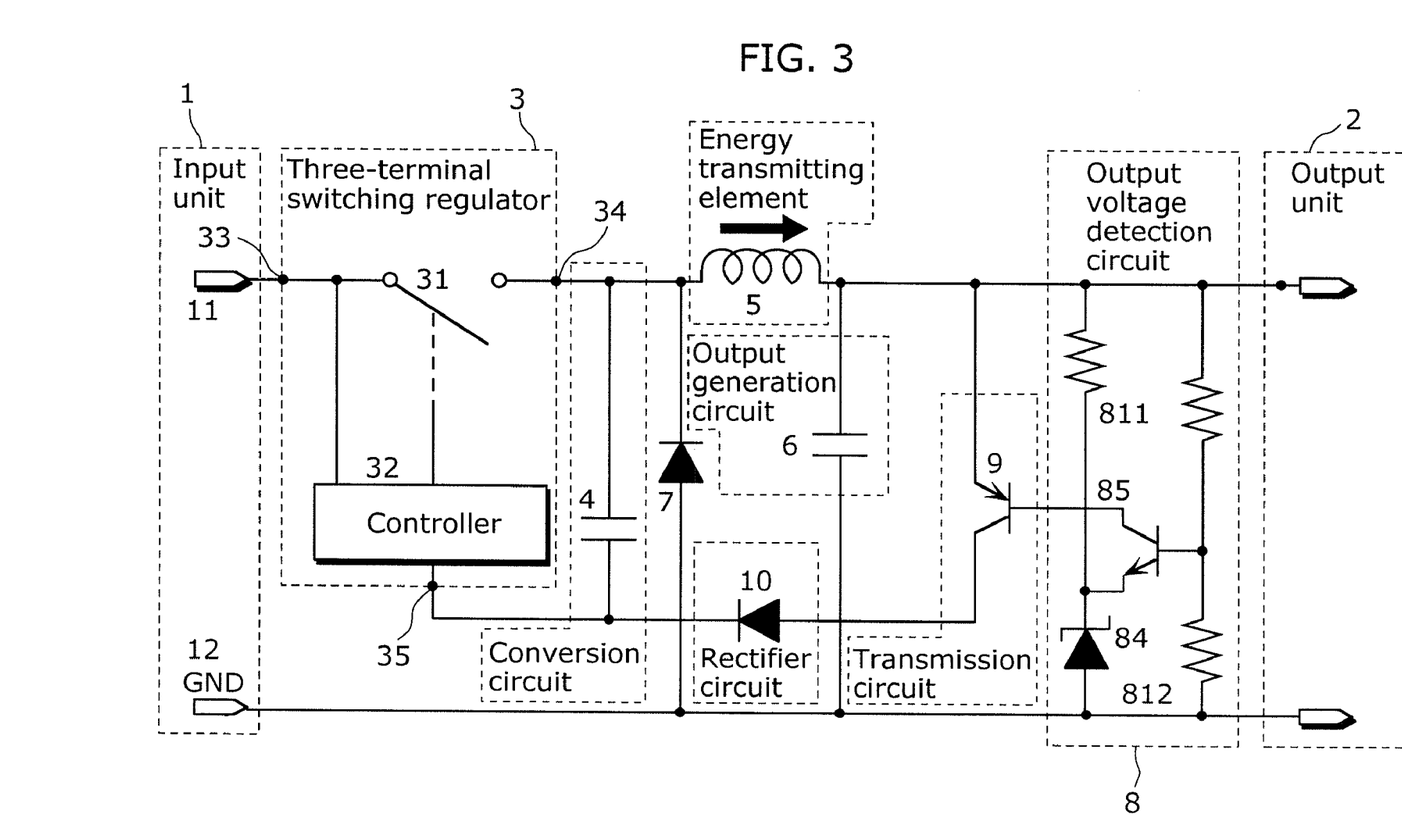
FIG. 3 is a schematic circuit diagram showing a configuration of a switching power supply circuit in Embodiment 2 of the present invention.

FIG. 3 is a schematic circuit diagram showing a configuration of a switching power supply circuit in Embodiment 2. It is possible, in Embodiment 1 above, to take a configuration including, for example, the first resistor 811, the second resistor 812, a Zener diode 84, and a PNP transistor 85 as shown in FIG. 3, as a circuit which detects an error in the output voltage VO of the output unit 2, converts the error into a current signal, and feeds a current corresponding to the current signal between the emitter and base of the PNP transistor 9.

With the output voltage detection circuit 8 in FIG. 3, the voltage at the node C between the first resistor 811 and the second resistor 812 fluctuates according to the fluctuations of the output voltage VO of the output unit 2, and the voltage at the node C is applied to the base of the PNP transistor 85. According to the fluctuations of the voltage applied to the base, a current flows between the collector and emitter of the PNP transistor 85. Since this current flows from the base of the PNP transistor 9, the current flows between the emitter and base of the PNP transistor 9 according to the error in the output voltage VO of the output unit 2.

Embodiment 3

A switching power supply circuit in Embodiment 3 of the present invention will be hereinafter described.

Figure 4:
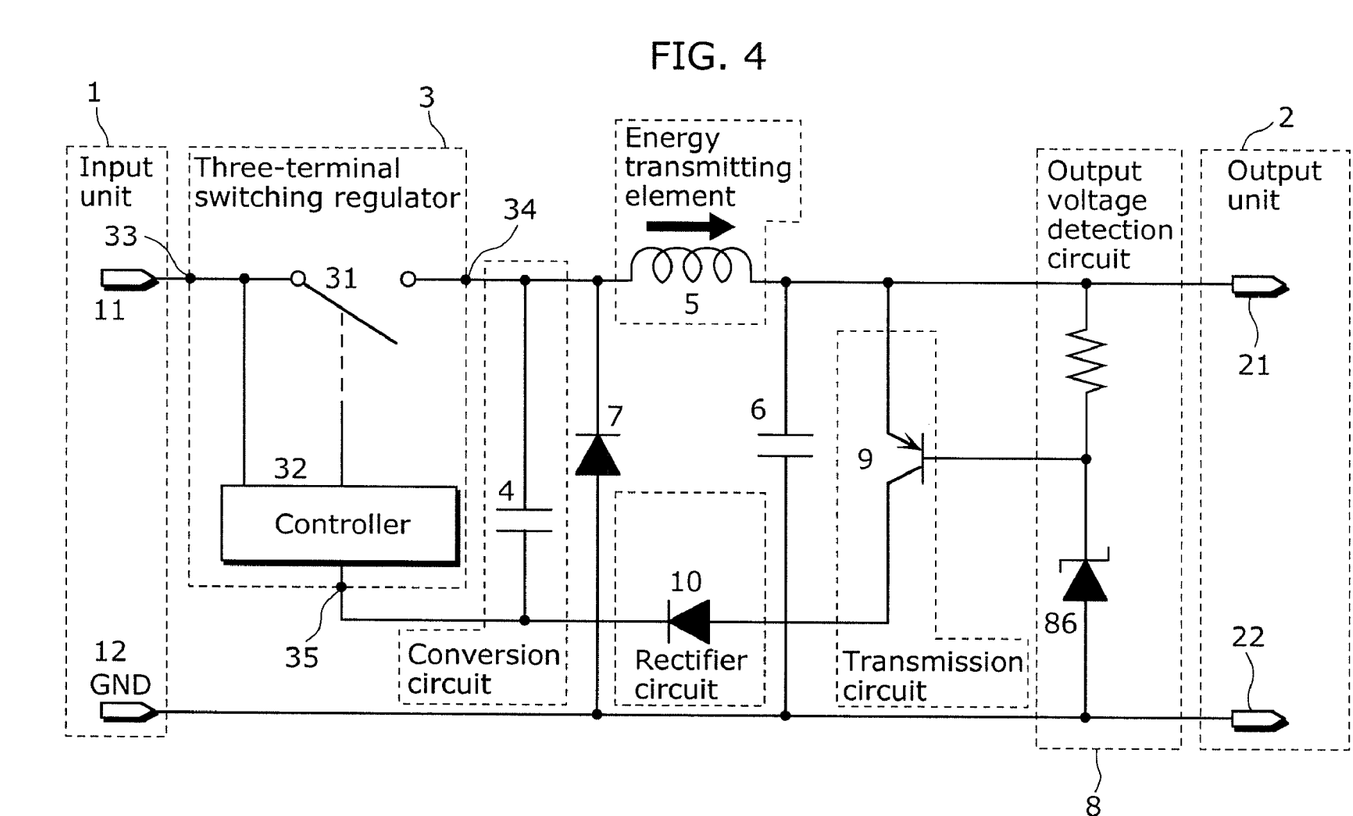
FIG. 4 is a schematic circuit diagram showing a configuration of a switching power supply circuit in Embodiment 3 of the present invention.

FIG. 4 is a schematic circuit diagram showing a configuration of a switching power supply circuit in Embodiment 3. It is possible, in Embodiment 1 above, to take a configuration including, for example, a Zener diode 86 as shown in FIG. 4, as a circuit which detects an error in the output voltage VO of the output unit 2, converts the error into a current signal, and feeds a current corresponding to the current signal between the emitter and base of the PNP transistor 9.

With the output voltage detection circuit 8 in FIG. 4, a current flows into the Zener diode 86 due to a Zener breakdown according to the fluctuations of the output voltage VO of the output unit 2, and a current which corresponds to the current flowing into the Zener diode 86 flows between the emitter and base of the PNP transistor 9. Thus, the current flows between the emitter and base of the PNP transistor 9 according to the error in the output voltage VO of the output unit 2.

Embodiment 4

A switching power supply circuit in Embodiment 4 of the present invention will be hereinafter described.

Figure 5:
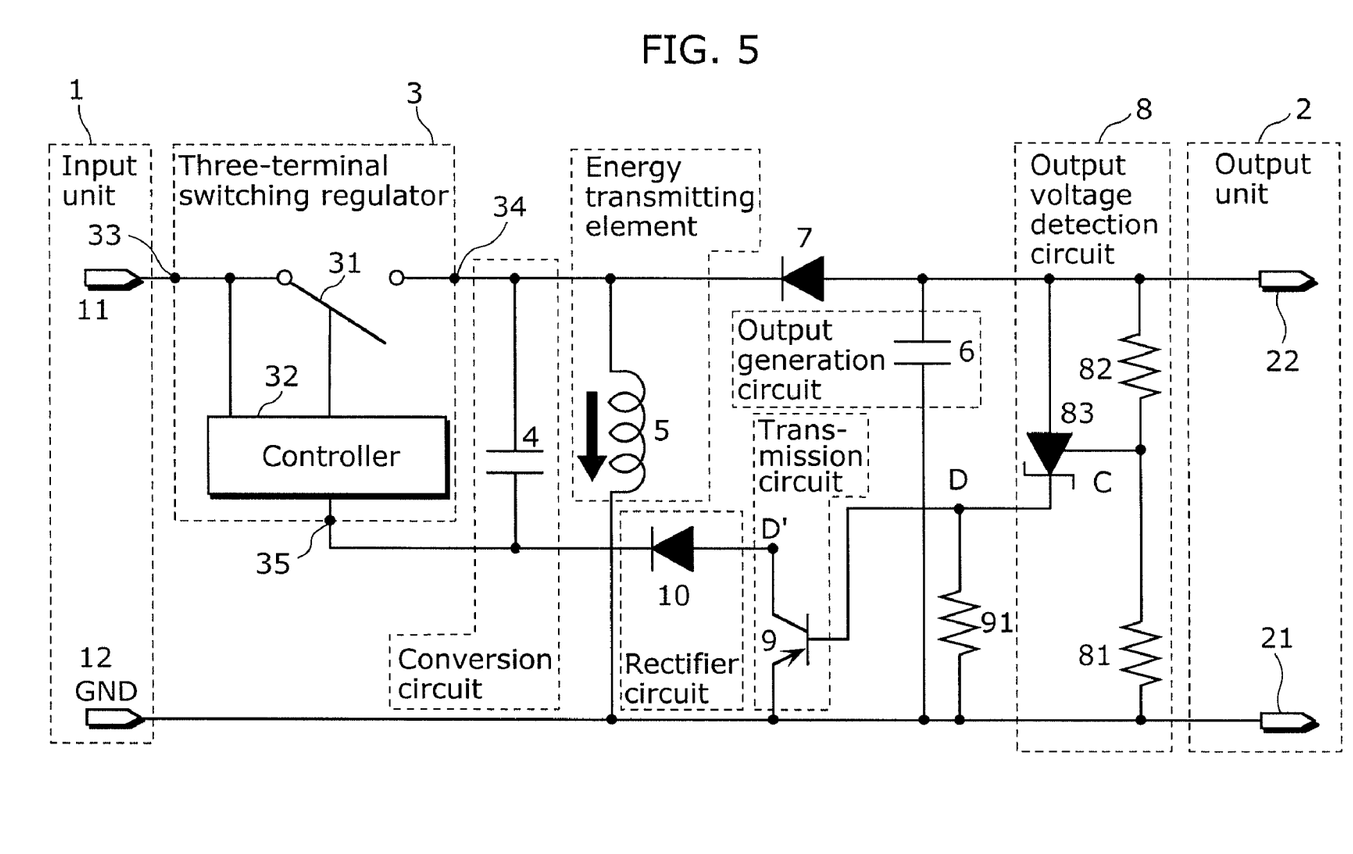
FIG. 5 is a schematic circuit diagram showing a configuration of a switching power supply circuit in Embodiment 4 of the present invention.

FIG. 5 is a schematic circuit diagram showing a configuration of a switching power supply circuit in Embodiment 4. Embodiment 1 has illustrated a step-down, non-insulated power supply circuit having the positive voltage terminal 11 of the input unit 1 connected to the three-terminal switching regulator 3 and the negative voltage terminal 12 of the input unit 1 connected to the negative voltage terminal 22 of the output unit 2. However, as shown in FIG. 5, it is also possible to take a configuration of a polarity-inverted, non-insulated power supply circuit having the positive voltage terminal 11 of the input unit 1 connected to the three-terminal switching regulator 3 and the negative voltage terminal 12 of the input unit 1 connected to the positive voltage terminal 21 of the output unit 2.

The operations of the switching power supply circuit having the above configuration will be hereinafter described.

Figure 6:
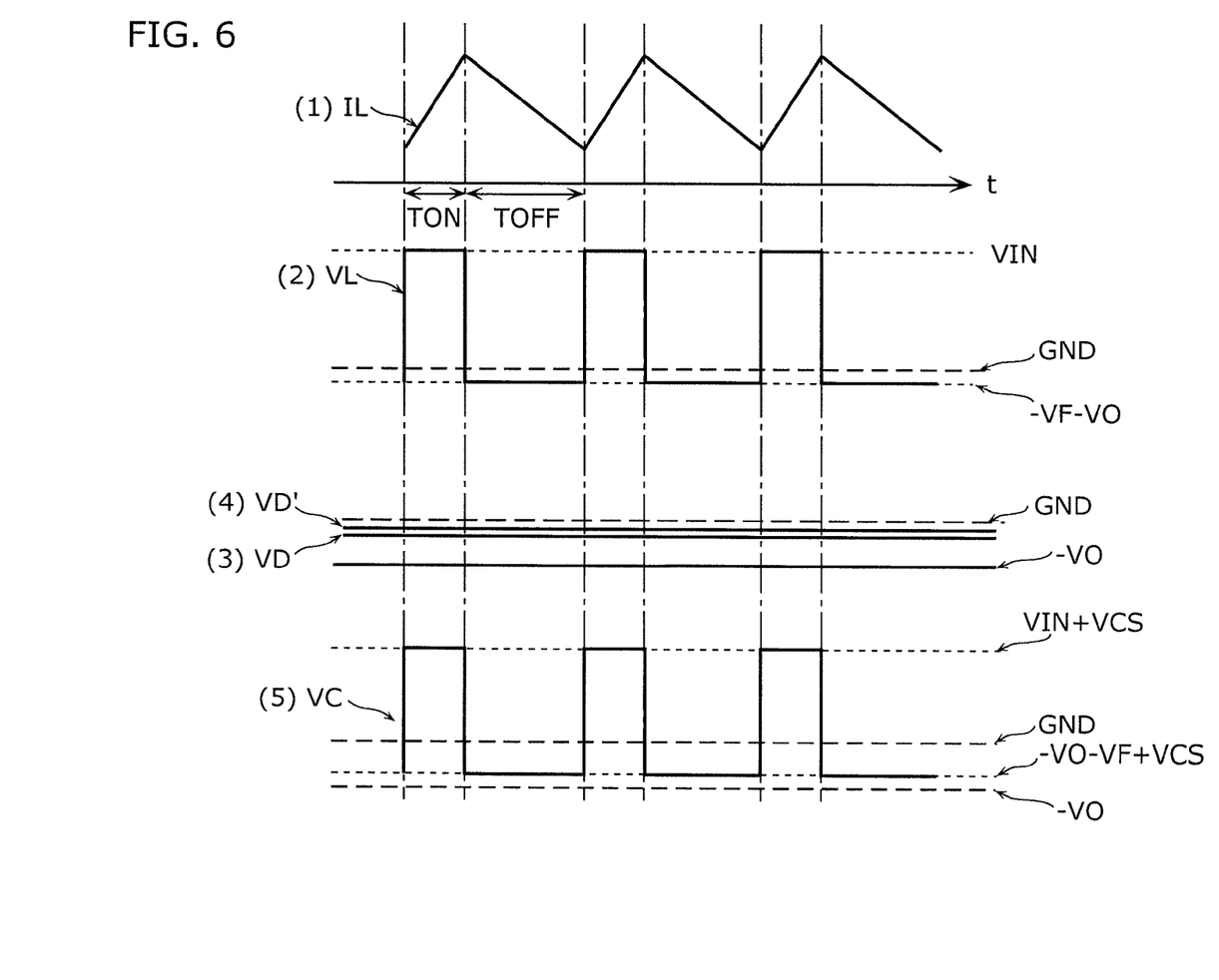
FIG. 6 is a waveform chart showing operations of a switching power supply circuit in Embodiment 4.

FIG. 6 is a waveform chart showing the operations of a switching power supply circuit in Embodiment 4. In FIG. 6, a waveform (1) IL shows an image of a current flowing through the coil 5, a waveform (2) VL shows an image of a potential difference created across the coil 5, a waveform (3) VD shows an image of a voltage at the base of the PNP transistor 9 (at the point D in FIG. 5), a waveform (4) VD' shows an image of a voltage at the collector of the PNP transistor 9 (at the point D' in FIG. 5), and a waveform (5) shows an image of a control terminal voltage VC.

In FIG. 6, TON is the ON period of the switch 31, TOFF is the OFF period of the switch 31, VS is a voltage at the source terminal 34, VC is a voltage at the control terminal 35, VCS is a voltage at the control terminal 35 with respect to a potential at the source terminal 34, and the waveforms (3) VD, (4) VD', and (5) VC are operating waveforms using a reference voltage GND of the power supply as a reference. With the operating waveforms in FIG. 6, the forward direction is assumed to be the direction of the arrow of the current IL flowing through the coil 5 in FIG. 5.

Here, when an input voltage VIN is applied to the input unit 1, the input voltage VIN is applied to the drain terminal 33 of the three-terminal switching regulator 3. Assuming the inductance of the coil 5 as L, the slope of the line representing the change in the current IL flowing through the coil 5 over time is proportional to VL/L. Thus, is as shown in the waveform (2) in FIG. 6, there is continuity between the drain terminal 33 and the source terminal 34 during the ON period TON of the switch 31, and the input voltage VIN is applied to the coil 5 on the source terminal 34 side. A potential difference VIN is thus created across the coil 5 between the source terminal 34 side and the output unit 2 side, thereby increasing the value of the current IL in the forward direction, and allowing energy to be charged in the coil 5.

During the OFF period TOFF of the switch 31, the continuity between the drain terminal 33 and the source terminal 34 is cut off, and the current flows into the diode 7. Therefore, the voltage VS at the source terminal 34 becomes lower than the voltage −VO at the negative voltage terminal 22 of the output unit 2 by the forward drop voltage VF across the diode 7 (−VO−VF). Since the potential GND at the positive voltage terminal 21 of the output unit 2 becomes higher than the potential VS at the source terminal 34, the value of the current IL flowing through the coil 5 decreases, and the energy charged in the coil 5 is provided to the output unit 2. The capacitor 6 serving as the output generation circuit smoothes the current IL and generates the output voltage −VO, and an output current IO becomes the average of the current IL.

During steady oscillations, the above ON period TON and OFF period TOFF are repeated so that the energy is supplied to the output unit 2.

The first resistor 81 and the second resistor 82 of the output voltage detection circuit 8 have resistance values which are set such that when the output voltage VO of the output unit 2 matches the output voltage set according to the power supply specifications, the voltage at the node C between the first resistor 81 and the second resistor 82 matches a reference voltage that is pre-set in the shunt regulator 83.

Here, when the output voltage VO increases or decreases, the voltage at the node C between the first resistor 81 and the second resistor 82 increases or decreases accordingly, and the voltage at the node C is applied to the reference voltage detection terminal of the shunt regulator 83. According to an error between the voltage at the node C and the reference voltage of the shunt regulator 83, the amount of the current flowing from the cathode to anode of the shunt regulator 83 fluctuates.

When the current flows into the shunt regulator 83, the current flows into the third resistor 91 inserted between the cathode of the shunt regulator 83 and the positive voltage terminal 21 of the output unit 2, and a voltage drop across the third resistor 91 generates a voltage across the emitter and base of the PNP transistor 9, causing a current to flow also between the emitter and base of the PNP transistor 9. Here, the fluctuations of the current flowing between the emitter and base of the PNP transistor 9 match the fluctuations of the current flowing from the cathode to anode of the shunt regulator 83. When the current flows between the emitter and base of the PNP transistor 9, a current corresponding to the emitter-base current flows between the emitter and collector. With the above series of operations, a current corresponding to the current signal of the error in the output voltage −VO flows between the emitter and collector of the PNP transistor 9 and into the anode of the diode 10.

Here, the voltage at the base of the PNP transistor 9 (the point D in FIG. 5) is lower than the voltage GND at the positive voltage terminal 21 of the output unit 2 by the voltage across the emitter and base of the PNP transistor 9, and has an operating waveform which is constant with respect to GND as shown in the waveform (3) in FIG. 6.

Similarly, during the steady operation, the feedback of the output voltage is consistently provided, and with the PNP transistor 9, the current consistently flows between the emitter and base, and there is continuity between the emitter and collector. Thus, as shown in the waveform (4) in FIG. 6, the operating waveform of the voltage VD' at the collector of the PNP transistor 9 is constant with a voltage lower than the voltage GND at the positive voltage terminal 21 of the output unit 2 by the voltage across the emitter and collector of the PNP transistor 9.

The current flowed into the anode of the diode 10 flows out from the cathode into the control terminal 35 of the three-terminal switching regulator 3 only when the voltage at the anode of the diode 10 (or the voltage at the collector of the PNP transistor 9, the point D' in FIG. 5) is higher than the voltage at the cathode of the diode 10 (or the control terminal voltage VC).

During the OFF period TOFF of the switch 31, the current flows into the diode 10 because the voltage VD' at the collector of the PNP transistor 9 is higher than the control terminal voltage VC as shown in the waveforms (4) and (5) in FIG. 6. Here, the voltage VD' at the collector of the PNP transistor 9 needs to be a value higher than the control terminal voltage VC by the forward drop voltage VF across the diode 10.

During the ON period TON of the switch 31, the current does not flow through the diode 10 because as shown in the waveforms (4) and (5) in FIG. 6, the voltage GND at the positive voltage terminal 21 of the output unit 2 becomes lower than the control terminal voltage VC and thus the voltage becomes higher at the cathode of the diode 10 than at the anode.

As a result, only during the OFF period TOFF of the switch 31, the diode 10 applies a current transmission signal in the direction from the PNP transistor 9 to the controller 32, and the capacitor 4 which serves also as a conversion circuit converts the pulsed current transmission signal corresponding to the current signal provided from the output voltage detection circuit 8 into a constant current/voltage feedback signal which is then applied to the control terminal 35. It becomes possible to steadily provide the controller 32 with feedback of a current/voltage feedback signal according to an error in the output voltage VO and, at the same time, to supply the power supply voltage of the controller 32. As a result, the above power supply control can be achieved.

Since the controller 32 controls switching of the switch 31 according the amount of the current flowing into the control terminal 35, the ON duty of the switch 31 varies so that the error in the output voltage VO reduces. This way, the output voltage VO is maintained constant.

Here, the difference between the voltage at the collector of the PNP transistor 9 (the waveform (4) in FIG. 6) and the voltage at the control terminal 35 (the waveform (5) in FIG. 6) fluctuates according to the switching of the switch 31. This voltage difference does not go beyond the fluctuation band of the control terminal voltage VC, and thus the diode 10 inserted between the collector of the PNP transistor 9 and the control terminal 35 needs to have a withstanding voltage equal to or greater than the fluctuation band of the control terminal voltage VC. Here, the fluctuation band of the control terminal voltage VC is (VIN+VCS)−(−VO−VF+VCS)= (VIN+VO+VF) as seen from the waveform (5) in FIG. 6, and thus the diode 10 needs to have a withstanding voltage equal to or greater than (VIN+VO+VF).

Further, as shown in the waveforms (3) and (4) in FIG. 6, the voltage at the base that is the input terminal of the PNP transistor 9 serving as the transmission unit (the waveform (3) in FIG. 6) and the voltage at the collector that is the output terminal (the waveform (4) in FIG. 2) are consistently constant with respect to GND. The voltage difference therebetween is determined based on the characteristics of the voltage across the emitter and collector of the PNP transistor 9, and thus, the withstanding voltage of the PNP transistor 9 is not exceeded. For this reason, the input and output of the transmission circuit need not be insulated.

As described, according to Embodiment 4, even a polarity-inverted, non-insulated power supply circuit allows configuration of the transmission circuit using a transistor which is insulated and does not have a high withstanding voltage.

It is to be noted that the output voltage detection circuit 8 according to the polarity-inverted, non-insulated power supply circuit shown in FIG. 5 includes the resistors 81 and 82 and the shunt regulator 83; however, the present invention is not limited to this. Any configuration may be adopted as long as it is a circuit which can detect an error in the output voltage VO of the output unit 2, convert the error into a current signal, and feed a current corresponding to the current signal between the emitter and base of the PNP transistor 9.

For example, it is obviously possible to take a configuration which includes the first resistor 811, the second resistor 812, the Zener diode 84, and the transistor 85 as in the output voltage detection circuit 8 in FIG. 3, and a configuration which includes the Zener diode 86 as in the output voltage detection circuit 8 in FIG. 4.

As an example for comparison with the switching power supply circuit of the above described embodiments, a switching power supply circuit which includes a photocoupler will be hereinafter described. FIG. 7 is a schematic circuit diagram showing a configuration of a switching power supply circuit as a comparative example of FIG. 1. The switching power supply circuit in the comparative example in FIG. 7 is different from that shown in FIG. 1 in that the switching power supply circuit in FIG. 7 includes a, photocoupler instead of the transmission circuit (the PNP transistor 9) and the rectifier circuit (the diode 10).

First, the three-terminal switching regulator 3 will be described.

The three-terminal switching regulator 3 has three terminals 33, 34, and 35 and includes the switch 31 and the controller 32 which is a control circuit. The switch 31 is, for example, a power MOS-FET transistor, and the oscillations (switching) of the switch 31 are controlled by the controller 32. Of the terminals of the three-terminal switching regulator 3, a terminal connected to the input unit 1 is called a drain terminal 33, a terminal connected to the coil 5 is called a source terminal 34, a terminal connected to a photocoupler 110 is called a control terminal 35. The three-terminal switching regulator 3 performs PWM control for varying the ON duty of the switch 31 according to the amount of current flowing from a phototransistor 112 into the control terminal 35. Further, as the current flows into the control terminal 35, the power of the controller 32 is supplied, and the control terminal voltage VC that is the power supply voltage of the controller 32 is consistently maintained constant with respect to the source terminal voltage VS that is the reference voltage of the controller 32.

Next, an auxiliary power supply circuit 120 which supplies power to the phototransistor 112 within the photocoupler 110 will be described.

The auxiliary power supply circuit 120 includes a rectifying element 121 which feeds a current only from the positive voltage terminal 21 of the output unit 2 to the collector of the phototransistor 112, and a capacitor 122 inserted between: a node between the source terminal 34 of the three-terminal switching regulator 3 and the coil 5; and a node between the rectifying element 121 and the collector of the phototransistor 112.

The operations of the conventional switching power supply circuit having the above configuration will be hereinafter described.

FIG. 8 is a waveform chart showing operations of the switching power supply circuit in the comparative example shown in FIG. 7. In FIG. 8, a waveform (1) IL shows a current flowing through the coil 5, and a waveform (2) VL shows a potential difference created across the coil 5. A waveform (3) VB shows a voltage at the cathode of a photodiode 111 of the photocoupler 110 (at the point B in FIG. 7). A waveform (4) VB' shows a voltage at the emitter of the phototransistor 112 (or a control terminal voltage) (at the point B' in FIG. 7).

In FIG. 8, TON shows the ON period of the switch 31, and TOFF shows the OFF period of the switch 31. VS shows a voltage at the source terminal 34, and VC shows a voltage at the control terminal 35. VCS is a voltage at the control terminal 35 with respect to a potential at the source terminal 34, and is consistently constant. Further, the waveforms (3) VB and (4) VB' are operating waveforms using a reference voltage GND of the power supply as a reference. Further, with the operating waveforms in FIG. 8, the forward direction is assumed to be the direction of the arrow of the current IL flowing through the coil 5 in FIG. 7.

Here, when an input voltage VIN is applied to the input unit 1, the input voltage VIN is applied to the drain terminal 33 of the three-terminal switching regulator 3. Assuming the inductance of the coil 5 as L, the slope of the line representing the change in the current IL flowing through the coil 5 over time is proportional to VL/L. Thus, as shown in the waveform (2) in FIG. 8, there is continuity between the drain terminal 33 and the source terminal 34 during the ON period TON of the switch 31, and the input voltage VIN is applied to the coil 5 on the source terminal 34 side. Thus, a potential difference (VIN−VO) is created across the coil 5 between the source terminal 34 side and the output unit 2 side, thereby increasing the value of the current IL in the forward direction, and allowing the energy to be charged in the coil 5. During this time, the source terminal voltage VS equals the input voltage VIN, and thus the control terminal voltage VC becomes equal to the voltage of (VIN+VCS) with respect to GND as shown in the waveform (4) VB'.

During the OFF period TOFF of the switch 31, the continuity between the drain terminal 33 and the source terminal 34 is cut off, and the current flows into the diode 7. Thus, the voltage at the source terminal 34 becomes lower than GND by the forward drop voltage VF across the diode 7. Since a potential difference (−VF−VO) is created across the coil 5 between the source terminal 34 side and the output unit 2 side, and the potential at the positive voltage terminal 21 of the output unit 2 becomes higher than the potential at the source terminal 34 side, the value of the current IL flowing through the coil 5 decreases, and the energy charged in the coil 5 is provided to the output unit 2. The capacitor 6 smoothes the output energy and generates the output voltage VO, and an output current IO becomes the average of the current IL flowing through the coil 5. During this time, the source terminal voltage VS is −VF with respect to GND, and thus the control terminal voltage VC becomes equal to the voltage of (−VF+VCS) with respect to GND as shown in the waveform (4) VB'.

During steady oscillations, the above ON period TON and OFF period TOFF are repeated so that the energy is supplied to a load (not shown) connected to the output unit 2.

The output voltage detection circuit 8 detects the output voltage VO at the output unit 2, converts, into a current signal, an error between the output voltage VO and the output voltage set according to the power supply specifications, and applies the current signal to the photodiode 111 of the photocoupler 110. Here, as shown in the waveform (3) VB, the voltage at the cathode of the photodiode 111 is lower than the output voltage VO by the forward voltage at the photodiode 111, and is almost constant with respect to GND.

As described, when a current flows into the photodiode 111, the phototransistor 112 of the photocoupler 110 is brought into conduction, and a current according to the error in the output voltage VO flows into the control terminal 35. Since the controller 32 controls the switching of the switch 31 according the amount of the current flowing into the control terminal 35, the ON duty of the switch 31 is varied so that the error in the output voltage VO reduces. This way, the output voltage VO is maintained constant.

Further, the current flowed through the phototransistor 112 also plays a role of charging the capacitor 4 between the control terminal 35 and the source terminal 34, and forming a power supply voltage of the controller 32 with a potential difference between the control terminal 35 and the source terminal 34 secured.

Here, in order to bring the phototransistor 112 of the photocoupler 110 into conduction (ON), the auxiliary power supply circuit 120 is necessary for maintaining the voltage across the collector and emitter of the phototransistor 112 and supplying a current flowing into the phototransistor 112.

With the auxiliary power supply circuit 120, a current flows into the diode 121 during the OFF period TOFF of the switch 31 because as shown in the waveform (4) in FIG. 8, the voltage VO at the positive voltage terminal 21 of the output unit 2 is higher than the control terminal voltage VC (VB'). At this time, the voltage at the cathode of the diode 121 is lower than the output voltage VO by the forward drop voltage VFO across the diode 121. Here, the output voltage VO needs to be such a value that makes the voltage at the cathode of the diode 121 higher than the control terminal voltage VC.

During the ON period TON of the switch 31, the voltage VO at the positive voltage terminal 21 of the output unit 2 is lower than the control terminal voltage VC and no current flows into the diode 121; however, the voltage at the collector of the phototransistor 112 is maintained by the capacitor 122 so as not to be lower than the control terminal voltage VC. As a result, the voltage at the collector of the phototransistor 112 is consistently higher than the control terminal voltage VC, and the voltage across the collector and emitter of the phototransistor 112 is secured.

With the switching power supply circuit in the comparative example shown in FIG. 7, while the voltage at the input terminal of the transmission circuit transmitting a signal that corresponds to the output voltage to the controller 32 is constant with respect to GND, there are fluctuations in the control terminal voltage VC at the output of the transmission circuit. Thus, a voltage difference is created between the input (the waveform (3) in FIG. 8) and the output (the waveform (4) in FIG. 8) of the transmission circuit. This voltage difference does not go beyond the fluctuation band of the control terminal voltage VC, and thus the transmission circuit needs to have, across its input and output, a withstanding voltage equal to or greater than the fluctuation band of the control terminal voltage VC. Here, the fluctuation band of the control terminal voltage VC is (VIN+VCS)−(−VF+VCS)=(VIN+VF) as seen from the waveform (4) in FIG. 8, and thus the transmission circuit needs to have a withstanding voltage equal to or greater than (VIN+VF) across its input and output. For this reason, feedback of the output voltage VO is provided using the transmission circuit having insulated input and output such as a photocoupler.

In contrast, according to the switching power supply circuit shown in FIG. 1, insertion, between the transmission unit and the controller 32, of the diode 10 that is a rectifying element having a sufficient withstanding voltage allows configuration of the transmission circuit using a transistor which is not insulated and does not have a high withstanding voltage. The transmission circuit in the comparative example shown in FIG. 7 needs an element having insulated input and output such as a photocoupler. However, in the present embodiment shown in FIG. 1 and so on, it is unnecessary to provide such an element having insulated input and output such as a photocoupler, and the transmission circuit can be configured using a PNP transistor and the like having non-insulated input and output. As a result, cost reduction is possible. Further, although the above embodiments show examples of using the coil 5 as the energy transmitting element of the non-insulated power supply circuit, the present invention is not limited to this. Any means may be used as long as the energy transmitting element transmitting energy from the three-terminal switching regulator 3 to the output unit 2 has an inductance component.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The switching power supply circuit according to the present invention can be provided at a lower cost as a non-insulated power supply circuit using a three-terminal switching regulator, in which a photocoupler conventionally being used as a transmission circuit for the output voltage control feedback can be replaced with a non-insulated component such as a transistor. Thus, the present invention is useful in application to, for example, techniques for reducing the cost of non-insulated power supply circuits.

What is claimed is:

1. A switching power supply circuit, comprising:
a switch connected to one of two input terminals to which an input voltage is applied;
an energy transmitter which transmits, as energy, the input voltage applied through said switch;
an output generation circuit which smoothes the energy transmitted by said energy transmitter and outputs the smoothed energy through two output terminals as an output voltage;
an output voltage detection circuit which detects the output voltage of said output generation circuit and generates a detected current signal according to the output voltage;
a transmission circuit which is connected to one of the two output terminals and outputs transmission signal according to a value of the detected current signal generated by said output voltage detection circuit;
a control circuit which generates a drive signal that controls a switching of said switch according to the transmission signal, using a potential at a node between said switch and said energy transmitter as an operating reference voltage;
a rectifier, is connected between said transmission circuit and said control circuit, which outputs the transmission signal only in a direction from said transmission circuit to said control circuit; and
a capacitor connected to a control terminal of said control circuit,
wherein an other one of the two output terminals is connected to a potential ground (GND),
said output voltage detection circuit includes:
a first resistor and a second resistor inserted in series between the two output terminals; and
a current signal output circuit which outputs, to said transmission circuit, a current signal according to a divided voltage at a node between said first resistor and said second resistor, as the detected current signal,
said current signal output circuit includes:
a shunt regulator having a terminal for detecting a reference voltage connected to the node between said first resistor and said second resistor;
a cathode connected to said transmission circuit; and
an anode connected to the other one of the two output terminals,
wherein said current signal output circuit generates the detected current signal according to an error between (i) a voltage of the node between said first resistor and said second resistor and (ii) a reference voltage that is pre-set in said shunt regulator,
said rectifier is configured to apply the transmission signal in a direction to said control circuit only when said switch is off, and to prevent current from flowing into said transmission circuit from said control circuit which has a higher potential than said transmission circuit when said switch is on,
said capacitor converts the transmission signal into a feedback signal with a constant current and voltage, and applies the feedback signal to said control terminal, and
said control circuit generates, based on the feedback signal, the drive signal for maintaining a voltage of said output generation circuit at a constant value.

2. The switching power supply circuit according to claim 1, wherein said rectifier has a withstanding voltage equal to or greater than a sum of the input voltage and a forward drop voltage across said rectifier.

3. The switching power supply circuit according to claim 1, further comprising:
a conversion circuit inserted between said rectifier and said control circuit,
wherein said conversion circuit converts the transmission signal into a constant voltage.

4. The switching power supply circuit according to claim 3, wherein said conversion circuit includes a capacitor inserted between: a node between said rectifier and said control circuit; and a node between said switch and said energy transmitter.

5. The switching power supply circuit according to claim 1, wherein said transmission circuit is a bipolar transistor.

6. The switching power supply circuit according to claim 1, wherein said transmission circuit is a metal oxide semiconductor (MOS) transistor.

7. A switching power supply circuit, comprising:
a switch connected to one of two input terminals to which an input voltage is applied;
an energy transmitter which transmits, as energy, the input voltage applied through said switch;
an output generation circuit which smoothes the energy transmitted by said energy transmitter and outputs the smoothed energy through two output terminals as an output voltage;
an output voltage detection circuit which detects the output voltage of said output generation circuit and generates a detected current signal according to the output voltage;
a transmission circuit which is connected to one of the two output terminals and outputs a transmission signal according to a value of the detected current signal generated by said output voltage detection circuit;
a control circuit which generates a drive signal that controls a switching of said switch according to the transmission signal, using a potential at a node between said switch and said energy transmitter as an operating reference voltage;
a rectifier connected between said transmission circuit and said control circuit, which outputs the transmission signal only in a direction from said transmission circuit to said control circuit, and
a capacitor connected to a control terminal of said control circuit,
wherein an other one of the two output terminals is connected to a potential ground (GND),
said output voltage detection circuit includes:
a resistor inserted in series between the two output terminals; and
a current signal output circuit, said current signal output circuit includes:
a Zener diode having a cathode connected to a terminal of the resistor which is not connected to one of the output terminals; and
an anode connected to the other one of the output terminals,
wherein said current signal output circuit (i) applies, according to a change in the output voltage, a Zener breakdown current generated by a Zener breakdown to said Zener diode, and (ii) provides the detected current signal according to the change in the output voltage from the node between said resistor and said Zener diode to a base terminal of said transmission circuit as the Zener breakdown current flowing in said resistor changes,
said rectifier is configured to apply the transmission signal in a direction to said control circuit only when said switch is off; and to prevent the current from flowing into said transmission circuit from said control circuit which has a higher potential than said transmission circuit when said switch is on, said capacitor converts the transmission signal into a constant current/voltage feedback signal, and applies the feedback signal to said control terminal, and said control circuit generates, based on the feedback signal, the drive signal for maintaining a voltage of said output generation circuit at a constant value.

8. The switching power supply circuit according to claim 7, wherein said control circuit generates the drive signal for controlling, according to a value of the transmission signal, an ON time period of said switch such that the output voltage detected by said output voltage detection circuit is constant.

9. The switching power supply circuit according to claim 7, wherein said control circuit generates the drive signal for controlling, according to a value of the transmission signal, a peak value of a current flowing from said switch into said energy transmitter during an ON time period of said switch such that the output voltage detected by said output voltage detection circuit is constant.

10. The switching power supply circuit according to claim 7, wherein said control circuit generates the drive signal for controlling, according to a value of the transmission signal, a switching frequency of said switch such that the output voltage detected by said output voltage detection circuit is constant.

11. The switching power supply circuit according to claim 7, wherein said control circuit generates the drive signal for controlling, according to a value of the transmission signal, a switching operating period and a switching suspending period of said switch such that the output voltage detected by said output voltage detection circuit is constant.

12. The switching power supply circuit according to claim 7, wherein said switch is connected to one of the two input terminals which is on a positive voltage side of the input voltage, an other input terminal on a negative voltage side of the input voltage is connected to one of the two output terminals which is on the negative voltage side, and said switching power supply circuit is of a positive voltage output type.

13. The switching power supply circuit according to claim 7, wherein said switch is connected to one of the two input terminals which is on a positive voltage side of the input voltage, an other input terminal on a negative voltage side of the input voltage is connected to one of the two output terminals which is on the positive voltage side, and said switching power supply circuit is of a negative voltage output type.

* * * * *